G. MOENCH.
Millstone-Ventilator.
No. 203,181. Patented April 30, 1878.
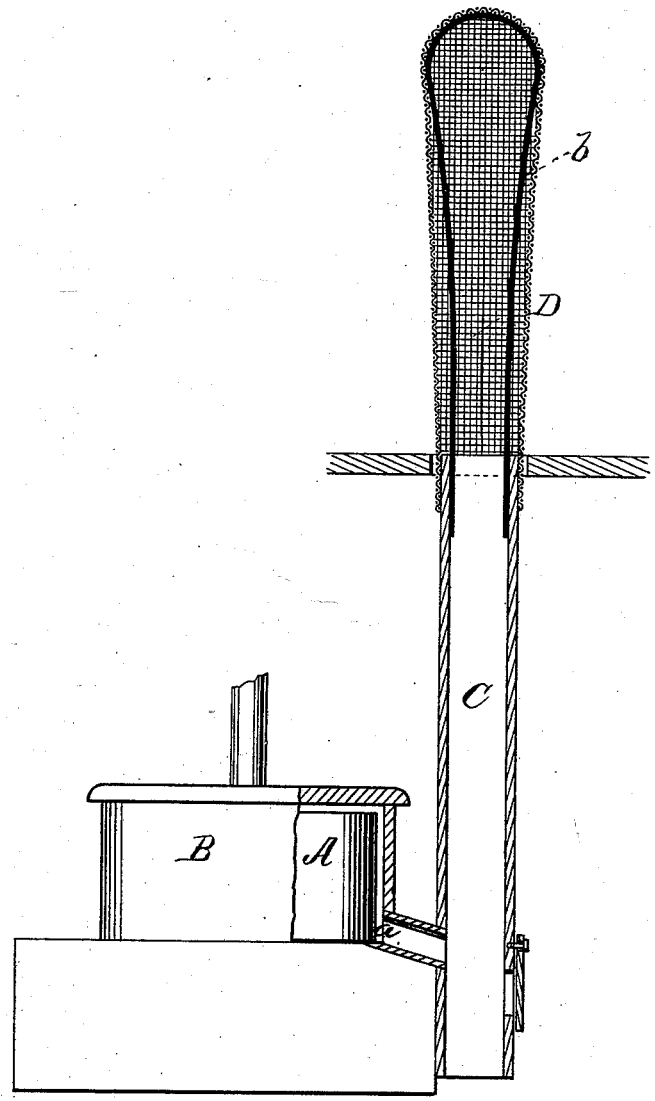
WITNESSES
Villette Anderson.
F. J. Masi.
INVENTOR
George Moench
by E. W. Anderson
ATTORNEY

UNITED STATES PATENT OFFICE.

GEORGE MOENCH, OF RUSHVILLE, ILLINOIS.

IMPROVEMENT IN MILLSTONE-VENTILATORS.

Specification forming part of Letters Patent No. 203,181, dated April 30, 1878; application filed March 23, 1878.

*To all whom it may concern:*

Be it known that I, GEORGE MOENCH, of Rushville, in the county of Schuyler and State of Illinois, have invented a new and valuable Improvement in Ventilators for Millstones; and I do hereby declare that the following is a full, clear, and exact description of the construction and operation of the same, reference being had to the annexed drawing, making a part of this specification, and to the letters and figures of reference marked thereon.

The drawing is a representation of a side view of my improved millstone-ventilator, partly in section, applied.

This invention has relation to improvements in devices for removing heated and damp air from the interior of the burr-hoop for the purpose of preventing the formation of dough inside the same.

The nature of the invention consists in the combination, with the casing of a millstone, of a ventilating-pipe extending below said casing, and connected to the lower portion thereof by a short pipe, and having its upper end above said casing, and terminating in a gauze sack distended by a suitable frame, whereby a draft is secured without a blower or other forcing apparatus, and thorough ventilation of the stones is effected, as will be hereinafter more fully shown and described.

In the annexed drawings, the letter A designates an ordinary millstone inclosed within a hoop, B, in the usual manner, and operated by suitable mechanism. The hoop or casing B has at its bottom an opening, *a*, through which the ground material escapes from the stones. C represents a tube, of sufficient diameter and material, secured to the hoop, and having communication, directly or indirectly, with the opening *a* aforesaid. This tube is carried up through the floor above, and carries an oblong wire frame, *b*, over which is drawn a bag, D, formed of bolting-cloth or other suitable reticulated material, as shown in the drawing. The tube C is open above and below, and may be made in two detachable sections, the lower of which may be disconnected from that next above for the purpose of clearing it out when requisite.

This arrangement establishes a current of cool fresh air up through the tube C, and draws out of the casing any accumulation of heated and damp air, which passes up this tube and escapes through the bag aforesaid. The hot, damp air being thus extracted by the upward draft through the exhaust-tube C, the formation of dough in the casing is absolutely prevented, and the clogging of the stones and educts for the meal effectually obviated.

What I claim as new, and desire to secure by Letters Patent, is—

The combination, with the casing of a millstone, of the ventilating-pipe C, extending below said casing, and connected to the lower portion thereof by a short pipe, *a*, and having its upper end above said casing, and terminating in a gauze sack, D, distended by a suitable frame, whereby a draft is secured without a blower or other forcing apparatus, and thorough ventilation of the stones is effected, substantially as specified.

In testimony that I claim the above I have hereunto subscribed my name in the presence of two witnesses.

GEORGE MOENCH.

Witnesses:
JOHN C. BAGBY,
JOHN S. BAGBY.